United States Patent [19]

Nakamura

[11] Patent Number: 4,946,367
[45] Date of Patent: Aug. 7, 1990

[54] ROTARY TYPE BLOW MOLDING MACHINE

[75] Inventor: Yoshinori Nakamura, Nagano, Japan

[73] Assignee: Nissei ASB Machine Co., Ltd., Japan

[21] Appl. No.: 350,749

[22] PCT Filed: Jul. 18, 1988

[86] PCT No.: PCT/JP88/00712

§ 371 Date: Mar. 16, 1989

§ 102(e) Date: Mar. 16, 1989

[87] PCT Pub. No.: WO89/00491

PCT Pub. Date: Jan. 26, 1989

[30] Foreign Application Priority Data

Jul. 17, 1987 [JP] Japan ................. 62-179595
Jul. 15, 1988 [JP] Japan ................. 63-176419

[51] Int. Cl.$^5$ ............ B29C 49/06; B29C 49/36; B29C 49/64
[52] U.S. Cl. ............ 425/526; 425/533; 425/534
[58] Field of Search ............ 425/533, 540, 537, 526, 425/538, 534

[56] References Cited

U.S. PATENT DOCUMENTS

| | | | |
|---|---|---|---|
| 3,146,287 | 8/1964 | Kleine-Albers | 425/145 |
| 3,806,294 | 4/1974 | Hehl | 425/145 |
| 3,889,849 | 6/1975 | Chandler | 425/145 |
| 3,941,534 | 3/1976 | Hunkar | 425/145 |
| 4,105,391 | 8/1978 | Aoki | 425/540 |
| 4,726,756 | 2/1988 | Aoki | 425/540 |
| 4,744,742 | 8/1986 | Aoki | 425/533 |

FOREIGN PATENT DOCUMENTS

| | | |
|---|---|---|
| 47-6240 | 7/1972 | Japan. |
| 50-139163 | 6/1975 | Japan. |
| 57-128519 | 8/1982 | Japan. |
| 60-244518 | 12/1985 | Japan. |
| 61-195766 | 8/1986 | Japan. |

Primary Examiner—Willard Hoag
Attorney, Agent, or Firm—Ostrolenk, Faber, Gerb & Soffen

[57] ABSTRACT

A rotary type molding machine for molding preforms and hollow molded products from the preforms includes a circular transfer plate with depending lip molds. The transfer plate is disposed above a machine bed and is suspended from a plate body which is itself supported at its edges on the machine bed. The transfer plate is rotatable and movable up and down. Rotation of the transfer plate enables the lip molds to be aligned to one or the other of an injection molding station, a temperature control station, an orientation blow molding station, and a molded product moving station. Molds and various related devices are disposed on the machine bed. The transfer plate is reciprocated by a vertically movable piston and its hydraulic cylinder. The piston is flexibly coupled to a driving shaft of an intermittently rotatable driving device which shaft is effective to rotate the transfer plate and remain coupled to the piston regardless of the vertical position thereof.

23 Claims, 4 Drawing Sheets

ROTARY TYPE BLOW MOLDING MACHINE

TECHNICAL FIELD

This invention relates to a rotary type molding machine which can be utilized for continuous molding of a preform or in situations where molding of a preform followed by orientation blow molding of a hollow molded product are continuously carried out.

BACKGROUND OF ART

A rotary molding machine of the type described herein includes one configuration which has a construction in which a base plate is secured upwardly relative to a machine bed, and an injection molding device which is movable up and down with respect to a transfer plate provided intermittently and rotatably on the underside of the base plate. The injection molding device is movable up and down to effect a clamping action. The other configuration has a construction in which an injection molding device is secured on one side thereof to one side of a machine bed, a base plate side is disposed movably up and down in opposed relation thereto, and a rotary plate is movable down together with the base plate to effect clamping.

The first machine configuration in which the base plate and the transfer plate are fixed has problems that since the injection mold device is moved up and down an every injection molding of a preform, an injection nozzle needs to be separated every time and therefore starting of measurement of resins material is delayed; and drooling or wire-drawing occurs every time the injection nozzle is separated, to a degree which depends on the type of resin. As a result, marginal portions of the injection nozzle or mold gate become stained and in addition a sprue gate is damaged by the resins adhered to the injection nozzle.

The second machine configuration, in which the base plate side is moved up and down, has been developed in order to solve such problems. However, this molding machine involves the problem that the transfer plate, the driving device therefor and various other devices required for molding are also moved up and down together with the base plate. Therefore, the weight which has to be moved vertically is large and as the molding machine becomes large in size, the vertical moving speed is restricted, making it difficult to open and close the lip mold at high speed. Particularly, when the vertically-moving stroke increases, the downwardly moving speed is accelerated so that the lip mold collides with the mold, thus requiring a buffer means. An improved injection orientation blow molding machine for hollow molded products, e.g. bottles, which are longitudinally long has been needed for some time.

SUMMARY OF THE INVENTION

This invention has been made in view of the above-described circumstances and problems. An object of the present invention is to provide a new rotary type molding machine in which an injection mold is secured to a machine bed side so that an injection device may be always placed in nozzle contact position to effect molding, the vertically-movable weight reduced, and a vertically-moving speed not accelerated due to a load. In accordance with the present invention, even if the verticall-moving stroke is large, opening and closing of a lip mold at a high speed can be carried out smoothly.

Another object of this invention is to provide a new rotary type molding machine in which both vertically-moving cylinder and driving device are positioned in the center of rotation of a moving plate, making it difficult to cause an unbalanced load, an eccentricity or like conditions. Also despite the use of the machine for long periods of time, the transfer plate is not inclined to impair rotation and a deviation in mold opening and closing will not occur.

For achieving the aforesaid objects, the present invention provides a rotary type molding machine in which lip molds, which also serve as holders for a preform and a hollow molded product are provided on at least four portions in the underside of the rotatable element. A circular transfer plate having a member receiving hole is provided on the surface on the lip molds above a machine bed supporting a central portion of a plate body by a rotary shaft. The lip molds have stop positions set to an injection molding operation portion, a temperature control operation portion, an orientation blow molding operation portion and a molded product removing operation portion in that order. Molds and various devices are so disposed, that the rotary shaft of the transfer plate is constituted by a piston of a vertically-moving cylinder. The piston and a driving shaft of an intermittently rotating driving device are connected freely with respect to an axial direction, and the transfer plate is provided so that it is movable up and down and intermittently rotatable with respect to the molds by the piston.

The aforesaid vertically-moving cylinder comprises a hydraulic cylinder installed on a support body disposed above the machine bed or the base plate provided on the machine bed, and a hydraulic oscillating motor. A servo motor or the like, as an intermittently rotating driving device, is provided on the upper end or lower end of the first mentioned hydraulic cylinder.

The support body is not limited to a plate-like body but may be a frame mounted over tie bars standing upright in the periphery of the machine bed. The piston for the vertically-moving cylinder serve as a rotary shaft and the driving shaft for the driving device are connected through a spline, the piston being rotated along with the driving shaft but only the piston is moved in an axial direction and moved up and down along with the transfer plate.

The aforementioned injection molding operation portion is equipped with an injection mold but the mold in the orientation blow molding operation portion is changed to a cooling mold when the rotary molding machine is used for continuous molding of a preform.

With the above-described structure, by the extension of the piston of the vertically-moving cylinder. The transfer plate is moved upward or downward so that the mold and lip molds are closed.

When the piston is contracted, the transfer plate is moved upward or downward so that the lip molds are separated from the mold, whereby they standby at a fixed level position. In such state, when the driving device is operated, the piston along with the driving shaft are rotated through the spline. Thereby, the transfer plate at the end of the piston also rotates so that the preform or molded product held by the lip mold rotates to the succeeding operation portion and stops.

BRIEF DESCRIPTION OF THE DRAWINGS

The drawings schematically show one embodiment of a rotary type molding machine according to this invention.

The drawings illustrates a rotary type molding machine in the case of carrying out injection orientation blow molding.

DETAILED DESCRIPTION OF THE INVENTION

Figure 1:
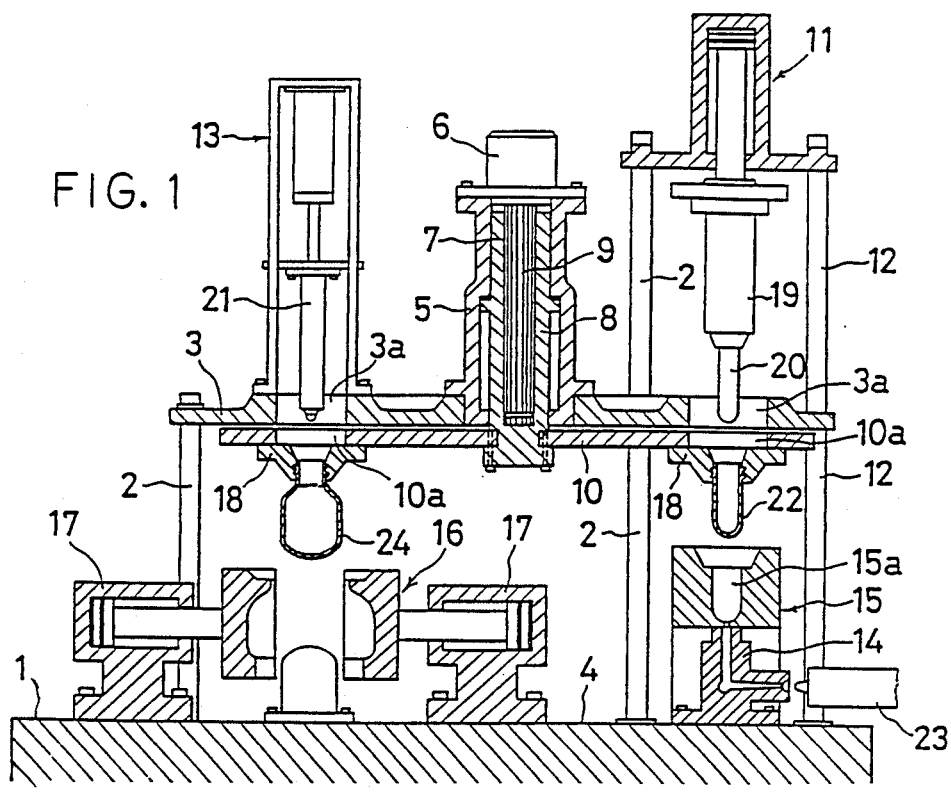
FIG. 1 is a longitudinal sectional side view when mold is opened in a first embodiment.
Figure 3:
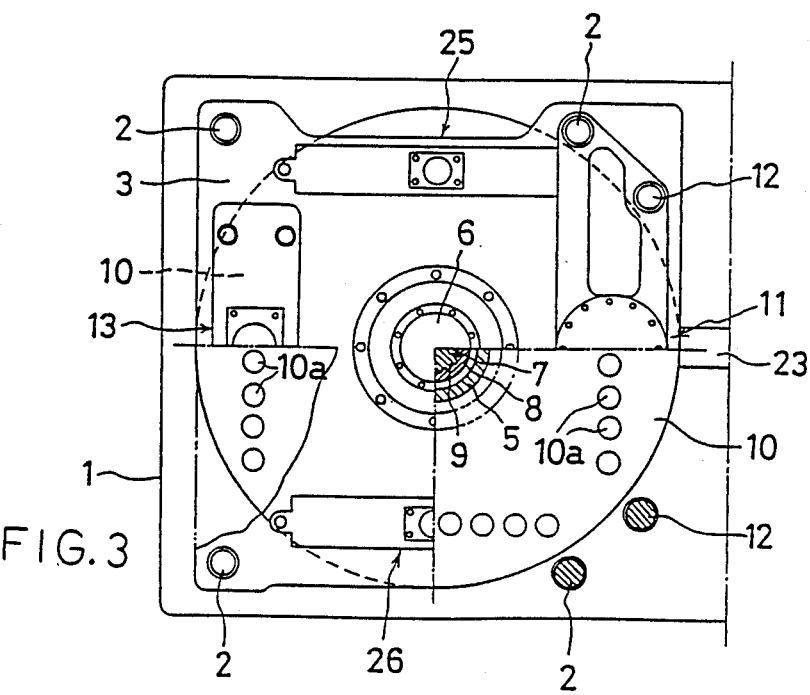
FIG. 3 is a partly cutaway plan view.
Figure 2:
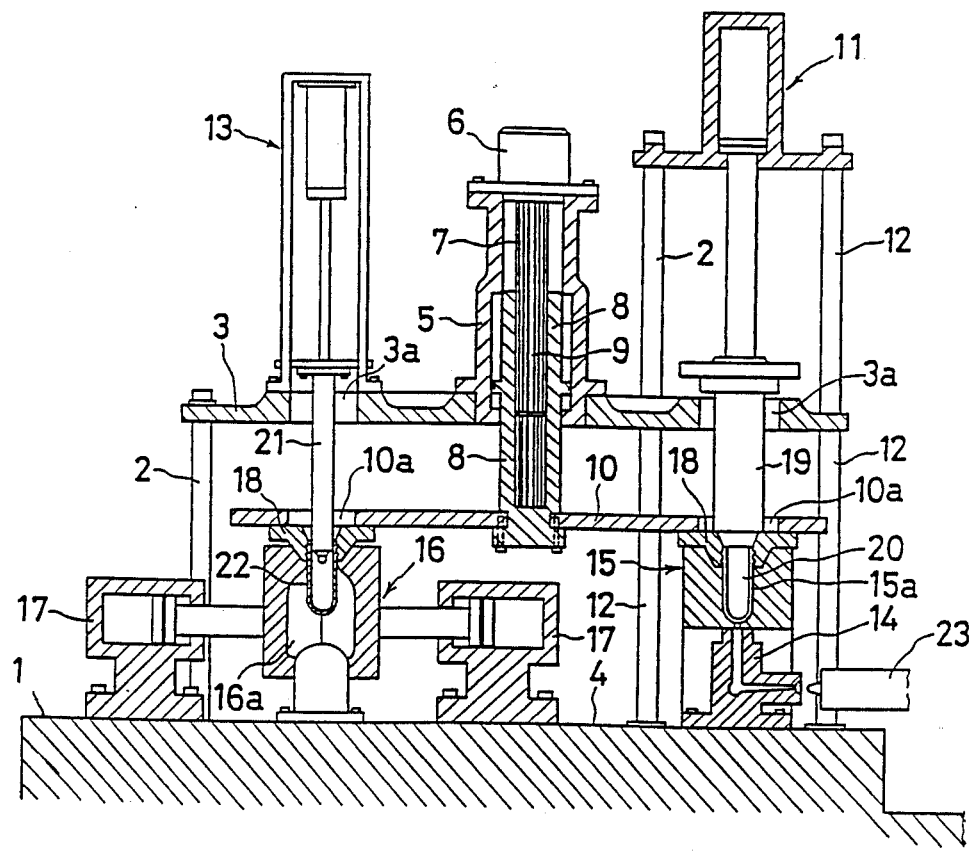
FIG. 2 is a longitudinal sectional side view when mold is closed.

FIGS. 1 and 2 respectively show longitudinal sectional side views of an injection molding operation portion and an orientation blow molding operation portion which are positioned opposite one another. Tie bars 2, 2 stand upright at four locations in the periphery of a machine bed 1. A plate-like support body 3 is horizontally secured to the tie bars 2, 2 in fixed spaced relation to a flat base plate 4 on the machine bed.

A hydraulically-operated vertically-moving cylinder 5 is longitudinally provided in the central portion of the support body 3, and an intermittently rotating driving device 6 in the form of a hydraulic oscillation motor whose rotational angle is 90° is connected to the top of the vertically-moving cylinder 5. A driving shaft 7 of the driving device 6 is inserted into a piston 8 of the vertically moving cylinder 5 and connected to the piston 8 by way of a spline 9.

A central portion of a transfer plate 10 is connected to the lower end of the piston 8 whereby the transfer plate 10 is movable up and down by the vertically-moving cylinder 5 and is intermittently rotatable by angles of 90° by the driving device 7.

A working space is formed between the transfer plate 10 and the machine bed 1 for utilization similar to the conventional molding machine of this kind, and four portions are utilized as an injection molding operation portion, a temperature control operation portion, an orientation blow molding operation portion and a molded production removing operation portion, respectively.

Above of the transfer plate of the injection molding operation portion, a clamping device 11 in the form of a hyraulic cylinder is fixedly provided on the tie bars 2 and 12, and a temperature control device 25, an orientation blowing device 13 and a molded product removing device 26 are provided on the respective operation portions of the support body 3. Although not shown, an air cylinder for vertically moving members to be operated or the like is provided on each of these devices similarly to prior art devices.

Furthermore, an injection mold 15 provided at its lower part with a hot runner block 14 is uprightly secured onto the base plate 4 of the injection molding operation portion, and a blow mold 16 is provided on the base plate 4 of the orientation blow molding operation portion so that it may be laterally opened and closed by hydraulically-operated opening and closing cylinders 17 and 17.

Four lip molds 18 and 18 for closing both the molds 15 and 16 are provided in a fixed spaced relation in the periphery of the lower surface of the transfer plate 10, and an injection core 20 and a blow core 21 at the end of a clamping member 19 are inserted into the lip molds 18 and 18 while extending through the member receiving holes 3a and 10a from the support body 3 and the transfer plate 3.

In the above-described rotary type molding machine, when the vertically-moving cylinder 5 is operated to extend the piston 8, the transfer plate 10 lowered from the support body side to the mold side, one lip mold 18 is closed in connection with the injection mold 15, the other lip mold 18 is closed in connection with the blow mold 16, and a preform 22 assumes a position of a blow cavity 16a. When the clamping device 11 and the orientation blowing device 13 are moved down after the mold has been closed, in the clamping device 11, the injection core 20 extends through the support body 3, the transfer plate 10 and the lip mold 18 and enters the injection cavity 15a, and the lower end of the clamping member 19 is pressed powerfully aginst the lip mold 18 whereby it is clamped thereagainst. In the orientation blowing device 3, the orientation blow core 21 is inserted into a lip portion of the preform 22 from the member receiving holes 3a and 10a.

In the injection molding operation portion, the resin is poured into the injection cavity 15a from the injection device 23 to mold the preform 22, and in the orientation blow molding operation portion, the preform 22 is axially oriented and expanded to the mold surface of the blow cavity 16a by blowing compressed air to mold a hollow product 24.

After completion of the molding, the clamping device 11 and the orientation blowing device 13 are moved upwardly and returned to their original position, and the blow mold 16 is opened.

However, when the piston 9 of the vertically-moving cylinder 5 is contracted, the transfer plate 10 is returned to the original position in a state wherein the preform 22 and the molded product 24 are held on the lip molds 18 and 18. When the driving device 6 is then rotated 90° counterclockwise, the transfer plate 10 also rotates along with the piston 9 through 90° to transfer the lip molds 18 and 18 to the succeeding operation portion.

Accordingly, by alternately carrying out the expansion operation in the vertically-moving cylinder 5 and the rotational operation at fixed angle by the driving device 6, it is possible to continuously carry out opening and closing of the lip molds and the mold devices and intermittent rotational movement of the transfer plate.

Figure 4:
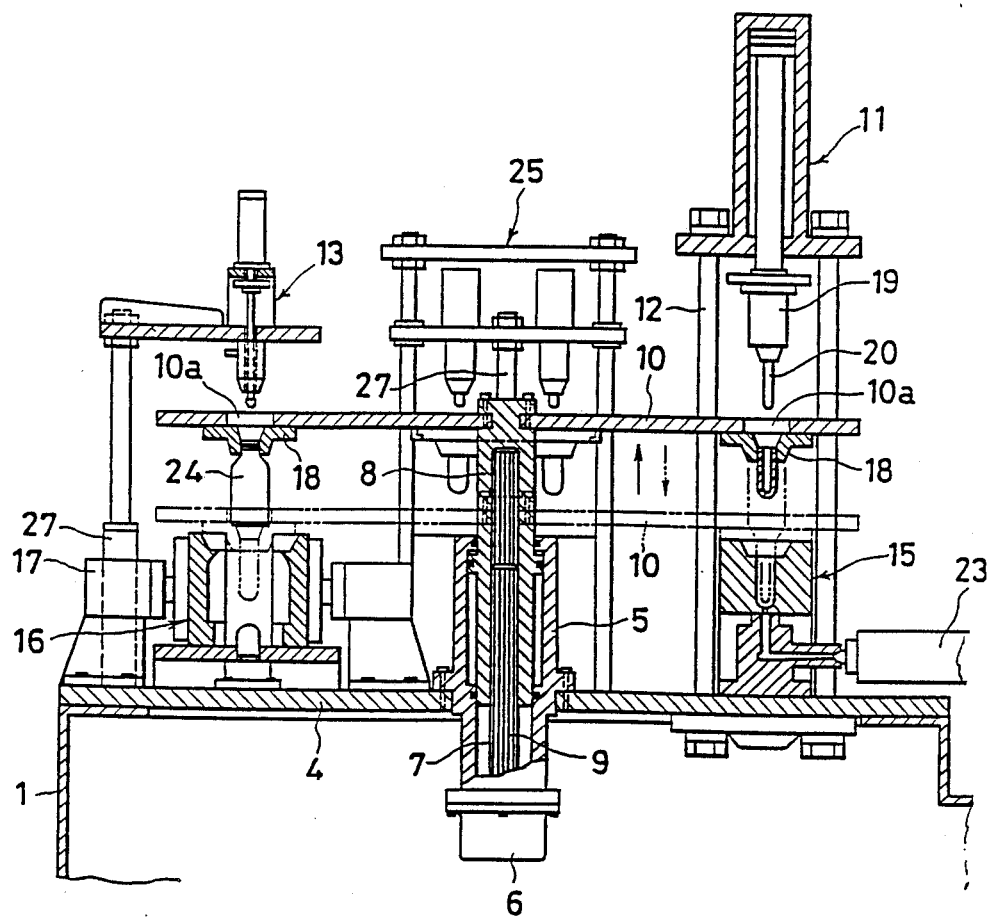
FIG. 4 is a longitudinal sectional view when the mold is opened in a further embodiment.
Figure 5:
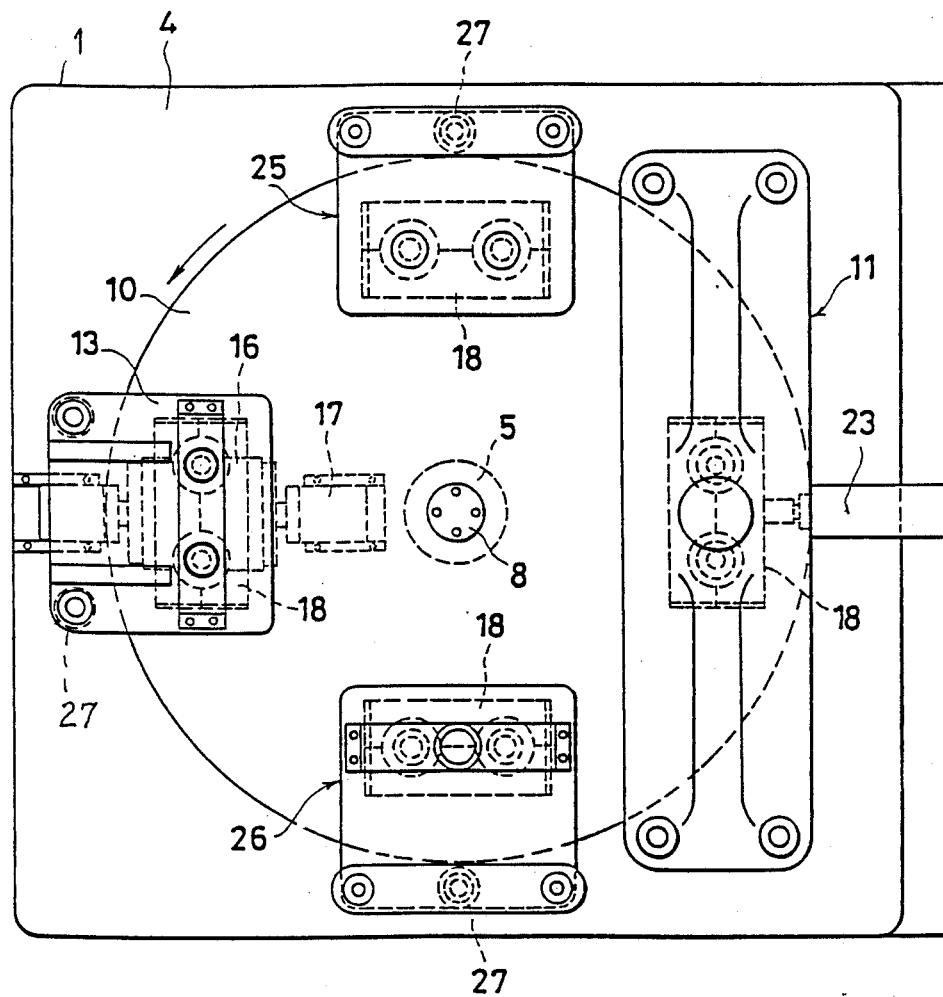
FIG. 5 is a plan view.

In the embodiment shown in FIGS. 4 and 5, the vertically movable cylinder 5 is installed on the base plate 4 on the machine bed 1, in which case the driving device 6 is also mounted superposed to the lower end of the vertically-moving cylinder 5 with the driving shaft 7 having the spline 9 in the periphery thereof upwardly.

In the case where the vertically-moving cylinder 5 is installed on the base plate 4, the support body in the aforesaid embodiment can be simplified, and the orientation blowing device 13, the temperature control device 25, the molded product removing device 26 and the like installed on the support body are individually independently instlled on the base plate 4 so that they may be moved up and down by the hydraulic cylinder 27.

In this embodiment, the transfer plate 10 is moved upward by extending of the piston and is moved downward by contracting it. Another embodiment is operated in a manner similar to that of the previous embodiment except as noted above, and will not be further described with other parts indicated by the same reference numerals in the drawings.

While the above-described embodiments have been described for the case where the rotary type molding machine is utilized as an injection orientation blow molding machine, it is to be noted in the present invention that the rotary type molding machine can be also utilized as a continuous injection molding machine for a preform. In this case, a blow molding device and a blow mold device are merely changed to a preform cooling device and a cooling mold device, though not shown in the drawings.

Moreover, the rotational angle is not limited to 90°. Rotational angles of 120°, 180° or the like can be used according to the number of the molding operation portions present.

In this invention, as mentioned above, the rotational shaft of the transfer plate is constituted by the piston for the vertically-moving cylinder, the piston and the driving shaft of the intermittently rotating driving device are freely connected with respect to the axial direction, and the transfer plate is provided so that the latter may be moved up and down and provided rotatably intermittently with respect to the molds. Therefore, the injection device can be always placed in nozzle contact with the injection mold secured to the machine bed for effecting molding. Furthermore, since only the transfer plate is moved up and down, the load is smaller than the prior art in which the upper base plate and the transfer plate are moved up and down, and even if the vertically-moving stroke is large, high speed opening and closing can be carried out smoothly and load imbalance, eccentricities and the like are not likely to occur, whereby the machine of the present invention can be widely utilized.

I claim:

1. A rotary molding machine, comprising:
   a machine bed;
   a plurality of operational stations disposed on the machine bed, including an injection molding station, a temperature control station, an orientation blow molding station, and a molded product removing station;
   a transfer plate disposed above the machine bed, rotating means for rotating the transfer plate about an axis and moving means for moving the transfer plate vertically along said axis, up and down relative to said machine bed;
   a plurality of lip molds supported by the transfer plate, said lip molds being effective for interacting with said operational stations located on said machine bed;
   said moving means comprising a stationary cylinder having a piston movable therein, said piston coupled to said transfer plate and effective for moving the same vertically up and down; and
   said rotating means comprising a stationary rotating driving device having a driving shaft coupled to said piston and effective to rotate said piston to thereby rotate said transfer plate, said driving shaft being flexibly coupled to said piston in a manner which maintains a driving connection with said piston in all vertical positions of said piston.

2. The rotary molding machine of claim 1, further comprising a respective member receiving hole in each of said lip molds for enabling insertion through said receiving holes of means for interacting with said stations.

3. The rotary molding machine of claim 2, wherein said transfer plate is circular and said moving and rotating means are disposed centrally relative to said circular transfer plate and further wherein said lip molds are located on said circular transfer plate in a manner which approximately equalizes the distribution of weight on said transfer plate relative to the center thereof.

4. The molding machine of claim 2, wherein said driving shaft is inserted into said piston and connected thereto by a spline.

5. The rotary molding machine of claim 2, wherein said driving shaft comprises at least first and second members which are telescopically disposed relative to one another.

6. The rotary molding machine of claim 2, wherein said rotating driving device comprises a hydraulically operated oscillation motor, and said cylinder comprises a hydraulic cylinder.

7. The rotary molding machine of claim 2, wherein said rotating driving device comprises a servomotor.

8. The rotary molding machine of claim 2, wherein said injection molding station comprises an injection mold and said orientation blow molding station comprises a blow molding mold.

9. The rotary molding machine of claim 2, wherein said injection molding station comprises an injection mold and said orientation blow molding station comprises a cooling mold.

10. The rotary molding machine of claim 2, further comprising a support body supported stationarily and horizontally above said machine bed and above said transfer plate, said moving and rotating means being secured at said support body.

11. The molding machine of claim 10, wherein said driving shaft is inserted into said piston and connected thereto by a spline.

12. The rotary molding machine of claim 10, wherein said driving shaft comprises at least first and second members which are telescopically disposed relative to one another.

13. The rotary molding machine of claim 10, wherein said rotating driving device comprises a hydraulically operated oscillation motor, and said cylinder comprises a hydraulic cylinder.

14. The rotary molding machine of claim 10, wherein said rotating driving device comprises a servomotor.

15. The rotary molding machine of claim 10, wherein said injection molding station comprises an injection mold and said orientation blow molding station comprises a blow molding mold.

16. The rotary molding machine of claim 10, wherein said injection molding station comprises an injection mold and said orientation blow molding station comprises a cooling mold.

17. The rotary molding machine of claim 2, further comprising a base plate supported stationarily and horizontally on said machine bed below said transfer plate, said cylinder of said moving means and said rotating driving device of said rotating means being stationarily affixed relative to said base plate.

18. The molding machine of claim 17, wherein said driving shaft is inserted into said piston and connected thereto by a spline.

19. The rotary molding machine of claim 17, wherein said driving shaft comprises at least first and second members which are telescopically disposed relative to one another.

20. The rotary molding machine of claim 17, wherein said rotating driving device comprises a hydraulically operated oscillation motor, and said cylinder comprises a hydraulic cylinder.

21. The rotary molding machine of claim 17, wherein said rotating driving device comprises a servomotor.

22. The rotary molding machine of claim 17, wherein said injection molding station comprises an injection mold and said orientation blow molding station comprises a blow molding mold.

23. The rotary molding machine of claim 17, wherein said injection molding station comprises an injection mold and said orientation blow molding station comprises a cooling mold.

* * * * *